(12) United States Patent
Takahashi

(10) Patent No.: US 8,563,179 B2
(45) Date of Patent: Oct. 22, 2013

(54) NONAQUEOUS SECONDARY BATTERY

(75) Inventor: Kentaro Takahashi, Sumoto (JP)

(73) Assignee: SANYO Electric Co., Ltd., Moriguchi-shi, Osaka (JP)

(*) Notice: Subject to any disclaimer, the term of this patent is extended or adjusted under 35 U.S.C. 154(b) by 193 days.

(21) Appl. No.: 12/979,760

(22) Filed: Dec. 28, 2010

(65) Prior Publication Data

US 2011/0183214 A1 Jul. 28, 2011

(30) Foreign Application Priority Data

Jan. 28, 2010 (JP) ................. 2010-016697

(51) Int. Cl.
*H01M 6/16* (2006.01)
*H01M 4/131* (2010.01)

(52) U.S. Cl.
USPC .......... 429/337; 429/324; 429/329; 429/223; 429/224; 429/231.3

(58) Field of Classification Search
None
See application file for complete search history.

(56) References Cited

U.S. PATENT DOCUMENTS

| | | | |
|---|---|---|---|
| 7,563,539 B2 * | 7/2009 | Kameyama et al. | 429/231.1 |
| 2004/0058251 A1 * | 3/2004 | Hamamoto et al. | 429/332 |
| 2008/0081261 A1 * | 4/2008 | Takahashi | 429/331 |
| 2009/0181311 A1 * | 7/2009 | Iwanaga et al. | 429/331 |

FOREIGN PATENT DOCUMENTS

| | | | |
|---|---|---|---|
| JP | 9-199112 A | | 7/1997 |
| JP | 2002-319405 A | | 10/2002 |
| JP | 2005310744 A | * | 11/2005 |
| JP | 2007-242303 A | | 9/2007 |
| JP | 2007-280830 A | | 10/2007 |
| JP | 2007-305453 A | | 11/2007 |
| JP | 2008-084705 A | | 4/2008 |

OTHER PUBLICATIONS

JP 09-199112 A Machine Translation, retrieved from JPO Sep. 24, 2012.*

* cited by examiner

*Primary Examiner* — Barbara Gilliam
*Assistant Examiner* — Robert S Carrico
(74) *Attorney, Agent, or Firm* — Westerman, Hattori, Daniels & Adrian, LLP

(57) ABSTRACT

A positive electrode active material has an average particle diameter of 4.5 to 15.5 μm and a specific surface area of 0.13 to 0.80 m$^2$/g. A positive electrode mixture layer contains at least one of a silane coupling agent and/or at least one of aluminum, titanium, or zirconium based coupling agent having an alkyl or an alkoxy groups having 1 to 18 carbon atoms at a content of 0.003% by mass or more and 5% by mass or less with respect to the mass of the positive electrode active material. The nonaqueous electrolyte contains a 1,3-dioxane derivative at a content of 0.05% by mass or more with respect to the total mass of the nonaqueous electrolyte. Thus a nonaqueous secondary battery that has good high-temperature cycle characteristics and suppresses an increase in self-discharge after repetition of charge and discharge cycles at high temperature is provided.

6 Claims, No Drawings

NONAQUEOUS SECONDARY BATTERY

TECHNICAL FIELD

The present invention relates to a nonaqueous secondary battery including a lithium composite oxide as a positive electrode active material and using a nonaqueous electrolyte containing a 1,3-dioxane derivative (hereinafter referred to as a "DOX derivative"). More particularly, the invention relates to a nonaqueous secondary battery that includes a lithium composite oxide as a positive electrode active material, and that, when used with a nonaqueous electrolyte containing a DOX derivative, has good charge and discharge cycle characteristics at high temperature (hereinafter referred to as "high-temperature cycle characteristics") and suppresses an increase in self-discharge after repetition of charge and discharge cycles at high temperature.

BACKGROUND ART

Recently, as power supplies for driving portable electronic equipment, such as cell phones, portable personal computers, and portable music players, and further, as power supplies for hybrid electric vehicles (HEVs) and electric vehicles (EVs), nonaqueous secondary batteries represented by lithium ion secondary batteries having a high energy density and high capacity are widely used.

As for the positive electrode active material in these nonaqueous secondary batteries, one of or a mixture of a plurality of lithium transition-metal composite oxides represented by $LiMO_2$ (where M is at least one of Co, Ni, and Mn), (namely, $LiCoO_2$, $LiNiO_2$, $LiNi_yCo_{1-y}O_2$ (y=0.01 to 0.99), $LiMnO_2$, $LiMn_2O_4$, $LiCo_xMn_yNi_zO_2$ (x+y+z=1)), phosphoric acid compounds having an olivine structure such as $LiFePO_4$, and the like, all of which can reversibly absorb and desorb lithium ions, is used.

Carbonaceous materials such as graphite and amorphous carbon are widely used as the negative electrode active material in nonaqueous secondary batteries. The reason is that carbonaceous materials have a discharge potential equal to that of metal lithium or a lithium alloy but do not cause dendrite growth, and thus carbonaceous materials have superior characteristics of high safety, superior initial efficiency, good potential flatness, and high density.

Carbonate esters which are also referred to as carbonates, lactones, ethers, esters, and the like are used alone or in mixtures of two or more as the nonaqueous solvent for a nonaqueous electrolyte. Among them, carbonate esters are widely used because they have an especially high dielectric constant and provide larger ion conductivity to the nonaqueous electrolyte. As the nonaqueous solvent, JP-A-2008-084705 discloses that, when a DOX derivative is added to a mixed solvent containing both ethylene carbonate (EC) and propylene carbonate (PC), oxidative decomposition of the nonaqueous electrolyte is suppressed, the nonaqueous electrolyte is electrochemically stabilized, and thus cycle characteristics are improved.

JP-A-09-199112 discloses an example in which a positive electrode mixture is mixed with an aluminum coupling agent in order to improve cycle characteristics when a nonaqueous secondary battery is charged and discharged at high voltage. Furthermore, JP-A-2002-319405 discloses an example in which a silane coupling agent having an organic reactive group such as an epoxy group and amino group and a bonding group such as a methoxy group and ethoxy group is dispersed in a positive electrode mixture in order to improve wettability of a positive electrode with an electrolyte in a nonaqueous secondary battery at low temperature and to improve output characteristics at low temperature.

JP-A-2007-242303 discloses an example in which a positive electrode active material is treated with a silane coupling agent having a plurality of bonding groups in order to improve cycle characteristics when intermittent cycles of a nonaqueous secondary battery are repeated. JP-A-2007-280830 discloses an example in which a silane coupling agent is present near a broken surface of a positive electrode active material occurring when a positive electrode mixture layer is compressed in order to improve cycle characteristics of a nonaqueous secondary battery. Furthermore, JP-A-2007-305453 discloses an example in which a slurry of an electrode active material binder is mixed with a surface treating agent and an electrode active material is surface-treated.

In the invention disclosed in JP-A-2008-084705, it is clear that cycle characteristics are improved because the nonaqueous electrolyte contains a DOX derivative. However, there is problem that when a nonaqueous electrolyte containing a DOX derivative is used, self-discharge increases after repetition of charge and discharge cycles at high temperature.

The inventions disclosed in JP-A-09-199112, JP-A-2002-319405, JP-A-2007-242303, JP-A-2007-280830, and JP-A-2007-305453 show that mixing a silane or aluminum coupling agent in a positive electrode mixture can possibly lead to an improvement in cycle characteristics and output characteristics in a low temperature environment to some extent. However, in JP-A-09-199112, JP-A-2002-319405, JP-A-2007-242303, JP-A-2007-280830, and JP-A-2007-305453, effects by adding a DOX derivative into a nonaqueous electrolyte is not described when the positive electrode mixture is mixed with a silane or aluminum coupling agent.

The inventors of the present invention have carried out various studies in order to suppress the increase of self-discharge after repetition of charge and discharge cycles at high temperature when such a nonaqueous electrolyte containing at least a DOX derivative as a nonaqueous solvent in the nonaqueous electrolyte is used. As a result, the inventors have found that the problems mentioned above can be solved when a positive electrode mixture contains a predetermined amount of a silane or aluminum coupling agent and the average particle diameter and the specific surface area of a positive electrode active material including a lithium composite oxide are maintained in a predetermined range, whereby the invention has been achieved.

SUMMARY

An advantage of some aspects of the invention is to provide a nonaqueous secondary battery including a lithium composite oxide as a positive electrode active material and using a nonaqueous electrolyte containing a DOX derivative that suppresses the increase of self-discharge after repetition of charge and discharge cycles at high temperature as well as has superior high-temperature cycle characteristics.

According to an aspect of the invention, a nonaqueous secondary battery of the invention includes a positive electrode plate formed with a positive electrode mixture layer having a lithium composite oxide as a positive electrode active material, a negative electrode plate, a separator, and a nonaqueous electrolyte. In the nonaqueous secondary battery, the positive electrode active material has an average particle diameter of 4.5 to 15.5 μm and a specific surface area of 0.13 to 0.80 $m^2/g$, the positive electrode mixture layer contains at least one of a silane coupling agent and a coupling agent represented by General Formula (I) at a content of 0.003% by mass or more and 5% by mass or less with respect to the mass of the positive electrode active material, and the nonaqueous electrolyte contains a 1,3-dioxane derivative represented by General Formula (II) at a content of 0.05% by mass or more and 3.0% by mass or less with respect to the total mass of the nonaqueous electrolyte:

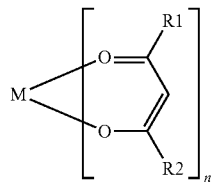

(where M is one atom selected from Al, Ti, and Zr, each of R1 and R2 is an alkyl group or an alkoxy group having 1 to 18 carbon atoms, and n represents an integer of 1 to 4)

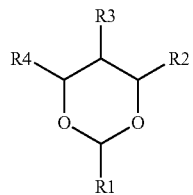

(where each of R1 to R4 is a hydrogen atom, a fluorine atom, a hydroxyl group, an alkyl or alkoxy group having 1 to 4 carbon atoms, an aryl group, a vinyl group, or an allyl group).

In the nonaqueous secondary battery of the invention, the DOX derivative represented by General Formula (II) is contained at a content of 0.05% by mass or more and 3.0% by mass or less with respect to the total mass of the nonaqueous electrolyte. When such composition is adopted, high-temperature cycle characteristics are improved, and the increase of self-discharge is suppressed after repetition of charge and discharge cycles at high temperature because decomposition of the nonaqueous electrolyte is suppressed, and the nonaqueous electrolyte is electrochemically stabilized. When the content of the DOX derivative in the nonaqueous electrolyte is less than 0.05% by mass with respect to the total mass of the nonaqueous electrolyte, the addition effect of the DOX derivative cannot be obtained. When the content of the DOX derivative in the nonaqueous electrolyte is more than 3.0% by mass with respect to the total mass of the nonaqueous electrolyte, high-temperature cycle characteristics decrease, and thus it is preferable that the content do not exceed 3.0% by mass.

It is believed that such characteristics of the DOX derivative are derived for the following reasons. That is, it is supposed that the DOX derivative has a low oxidation potential and forms a stable surface film on a positive electrode surface, and thus oxidative decomposition of a nonaqueous electrolyte is suppressed to provide an effect for keeping cycle characteristics. However, in a nonaqueous secondary battery in which a DOX derivative is added to the nonaqueous electrolyte, the amount of transition-metals eluted from the positive electrode active material becomes large probably due to by-products during formation of the oxidation film. The elution of transition-metals is more accelerated at higher temperature. Furthermore, the eluted transition-metals may be precipitated on a negative electrode surface. It is supposed that the DOX derivative readily forms a stable protective film on a surface of the transition metals precipitated on the negative electrode surface. Thus, it is supposed that a micro short circuit path is readily formed after repetition of charge and discharge cycles at high temperature, and self-discharge proceeds.

Examples of the DOX derivative include 1,3-dioxane, 2-methyl-1,3-dioxane, 4-methyl-1,3-dioxane, 2,4-dimethyl-1,3-dioxane, 4,4-dimethyl-1,3-dioxane, 4-phenyl-1,3-dioxane, 2,2-dimethyl-5-hydroxy-1,3-dioxane, 4,4,6-trimethyl-2-vinyl-1,3-dioxane, 5-aryl-1,3-dioxane, and 5-ethoxy-1,3-dioxane. These DOX derivatives may be used in mixtures of two or more.

In the nonaqueous secondary battery of the invention, the positive electrode mixture layer is required to contain a coupling agent including at least one of a silane coupling agent and a coupling agent represented by General Formula (I). When the positive electrode mixture layer does not contain such a coupling agent or contains other coupling agents, both self-discharging characteristics and high-temperature cycle characteristics decrease even when the conditions of the invention other than this are satisfied.

In the nonaqueous secondary battery of the invention, the positive electrode mixture layer is required to contain a coupling agent including at least one of a silane coupling agent and a coupling agent represented by General Formula (I) at a content of 0.003% by mass or more and 5% by mass or less with respect to the mass of the positive electrode active material. When the content of such a coupling agent is less than 0.003% by mass with respect to the mass of the positive electrode active material, the content is too low to provide the addition effect of the coupling agent even if the other conditions of the invention are satisfied. When the content of such a coupling agent is more than 5% by mass with respect to the mass of the positive electrode active material, positive electrode resistance becomes large to reduce initial capacity even if the other conditions of the invention are satisfied.

Such an effect by mixing the positive electrode mixture layer with a coupling agent is supposed to be provided for the following reasons. That is, it is supposed that, when a coupling agent is previously added into a positive electrode mixture, the coupling agent and an oxidative decomposition compound from the DOX derivative are interacted, and consequently, a hard film is formed on the positive electrode surface. Thus, it is supposed that the elution of transition metals from the positive electrode active material is suppressed, and self-discharge does not readily occur after high-temperature charge and discharge cycles. In contrast, it is supposed that, when the content of a coupling agent in the positive electrode mixture is excessively high, the film formed on the positive electrode surface is excessively hard, and thus the positive electrode resistance becomes large, and that the content of the positive electrode active material per unit volume decreases to reduce the initial capacity because a coupling agent does not directly contribute to the electrode reaction.

In the nonaqueous secondary battery of the invention, the positive electrode active material is required to have an average particle diameter of 4.5 to 15.5 μm and a specific surface area of 0.13 to 0.80 m²/g. When the positive electrode active material has an average particle diameter of less than 4.5 μm, both self-discharging characteristics and high-temperature cycle characteristics decrease even when the conditions of the invention other than this are satisfied. When the positive electrode active material has an average particle diameter of more than 15.5 μm, self-discharging characteristics are good but high-temperature cycle characteristics decrease even when the conditions of the invention other than this are satisfied.

In the nonaqueous secondary battery of the invention, when the positive electrode active material has a specific surface area of less than 0.13 $m^2/g$, self-discharging characteristics are good but high-temperature cycle characteristics decrease even when the conditions of the invention other than this are satisfied. When the positive electrode active material has a specific surface area of more than 0.80 $m^2/g$, both self-discharging characteristics and high-temperature cycle characteristics decreases even when the conditions of the invention other than this are satisfied.

Such an effect obtained by limiting the average particle diameter and the specific surface area of the positive electrode active material is supposed to be provided for the following reasons. In other words, it is supposed that the area contributing to a reaction on the positive electrode active material surface is increased when the positive electrode active material has an excessively small average particle diameter or an excessively large specific surface area; oxidative decomposition compounds of the DOX derivative are excessively generated; and consequently, the oxidative decomposition compounds of the DOX derivative cannot thoroughly react with a coupling agent. Conversely, it is supposed that when the positive electrode active material has an excessively large average particle diameter or an excessively small specific surface area, the positive electrode surface film formed has a large resistance, and thus high-temperature cycle characteristics decrease.

Preferred examples of the positive electrode active material used in the nonaqueous secondary battery of the invention include lithium composite oxides such as $LiCoO_2$, $LiNiO_2$, $LiMn_2O_4$, $LiMnO_2$, $LiNi_{1-x}Mn_xO_2$ ($0<x<1$), $LiNi_{1-x}Co_xO_2$ ($0<x<1$), and $LiNi_xMn_yCo_zO_2$ ($0<x, y, z<1$, $x+y+z=1$).

Examples of the negative electrode active material usable in the nonaqueous secondary battery of the invention include carbon materials such as graphite, non-graphitizable carbon, and graphitizable carbon; titanium oxides such as $LiTiO_2$ and $TiO_2$; metalloid elements such as silicon and tin; and an Sn—Co alloy.

In the nonaqueous secondary battery of the invention, examples of other nonaqueous solvents usable in mixtures with the DOX derivative represented by General Formula (II) include cyclic carbonate esters such as ethylene carbonate (EC), propylene carbonate (PC), and butylene carbonate (BC); fluorinated cyclic carbonate esters; cyclic carboxylic acid esters such as γ-butyrolactone (BL) and γ-valerolactone (VL); chain carbonate esters such as dimethyl carbonate (DMC), ethyl methyl carbonate (EMC), diethyl carbonate (DEC), methyl propyl carbonate (MPC), and dibutyl carbonate (DNBC); fluorinated chain carbonate esters; chain carboxylic acid esters such as methyl pivalate, ethyl pivalate, methyl isobutyrate, and methyl propionate; amide compounds such as, N,N'-dimethylformamide and N-methyloxazolidinone; sulfur compounds such as sulfolane; and ambient temperature molten salts such as 1-ethyl-3-methylimidazolium tetrafluoroborate. These solvents are desirably used in mixtures of two or more. Among them, chain carbonate esters such as EC and PC, fluorinated cyclic carbonate esters, chain carbonate esters, fluorinated chain carbonate esters, and tertiary carboxylic acid esters are specifically preferred.

Microporous membrane separators formed from polyolefin materials such as polypropylene and polyethylene may be selected as a separator used in the nonaqueous secondary battery of the invention. The separator may be mixed with a resin having a low melting point in order to ensure the shutdown response of the separator, and may be laminated with a high-melting resin or be a resin supported with inorganic particles in order to obtain heat resistance.

The nonaqueous electrolyte used in the nonaqueous secondary battery of the invention may further include vinylene carbonate (VC), vinyl ethyl carbonate (VEC), succinic anhydride (SUCAH), maleic anhydride (MAAH), glycolic anhydride, ethylene sulfite (ES), divinyl sulfone (VS), vinyl acetate (VA), vinyl pivalate (VP), catechol carbonate, biphenyl (BP), and the like as a compound for stabilizing electrodes. These compounds may be used in mixtures of two or more as needed.

Lithium salts that are commonly used as the electrolyte salt in a nonaqueous secondary battery may be used as the electrolyte salt dissolved in the nonaqueous solvent used in the nonaqueous secondary battery of the invention. Examples of such a lithium salt include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures of these substances. Among them, $LiPF_6$ (lithium hexafluorophosphate) is specifically preferred. The dissolution amount of an electrolyte salt is preferably 0.5 to 2.0 mol/L with respect to the nonaqueous solvent.

In the nonaqueous secondary battery of the invention, the nonaqueous electrolyte may be not only liquid but also gel.

A silane coupling agent having at least one organic functional group and a plurality of bonding groups in the molecule may be used as a silane coupling agent capable of being employed in the nonaqueous secondary battery of the invention. The organic functional group may be any groups having various hydrocarbon skeletons. Examples of the organic functional group include an alkyl group, a mercaptopropyl group, and a trifluoropropyl group. Examples of the bonding group include a hydrolyzable alkoxy group.

In a coupling agent having the structure of General Formula (I), M may be one atom selected from Al, Ti, and Zr, but Al is specifically preferred. When M is Al, the coupling agent can be synthesized at low cost, and better results can be obtained than when M is Ti or Zr.

In a coupling agent having the structure of General Formula (I), the coupling agent has the large effect on improving characteristics when at least one of R1 and R2 is an alkoxy group (such as an ethoxy group, an iso-propoxy group, and a tert-butoxy group). It is preferable that an alkoxy group (such as an iso-propoxy group and a tert-butoxy group) be bonded to atom M in General Formula (I) because the reactivity to a positive electrode active material is improved. The number of alkoxy groups bonded to atom M is preferably two or less in order to improve the hydrolysis resistance of the compound.

A coupling agent may be contained in the positive electrode mixture layer in the nonaqueous secondary battery of the invention by direct coating on the positive electrode plate or mixing in a positive electrode mixture slurry. The coupling agent is not specifically limited and may be diluted in any solvent for use. Suitable examples of the solvent include organic solvents including ketones such as acetone and methyl ethyl ketone (MEK), ethers such as tetrahydrofuran (THF), alcohols such as ethanol and isopropanol, and N-methyl-2-pyrrolidone (NMP) and a silicone oil.

DESCRIPTION OF EXEMPLARY EMBODIMENTS

Exemplary embodiments of the invention will now be described in detail with reference to examples and comparative examples. It should be noted that the examples described below are illustrative examples of nonaqueous secondary batteries for embodying the technical spirit of the invention and are not intended to limit the invention to these examples, and the invention may be equally applied to various modifications without departing from the technical spirit described in the claims.

First, a specific method for producing a nonaqueous secondary battery common to various examples and comparative examples will be described.

Preparation of Positive Electrode

A positive electrode mixture was prepared by mixing 95% by mass of various positive electrode active materials, 2.5% by mass of amorphous carbon HS-100 (trade name) as a conductive material, and 2.5% by mass of polyvinylidene fluoride (PVdF). To the binder, 50% by mass of N-methylpyrrolidone (NMP) with respect to the mass of the positive electrode mixture was added to prepare a slurry. To the obtained slurry, a predetermined amount of various coupling agents was added. The whole was thoroughly stirred and then coated on both sides of an aluminum foil sheet with a thickness of 12 μm using the doctor blade method (coating amount: 400 g/m$^2$). The coated foil was heated and dried (70 to 140° C.) to remove NMP and then formed under pressure so as to have a packing density of 3.70 g/cm$^3$ (3.12 g/cm$^3$ for LiMn$_2$O$_4$, LiMn$_{1/3}$Ni$_{1/3}$CO$_{1/3}$O$_2$)). Then, the foil was cut into a predetermined size to give a positive electrode plate.

Here, the average particle diameter and the specific surface area of the positive electrode active material particles were controlled by pulverization and classification operations with Mix Muller. The average particle diameter was measured with a laser diffraction particle size analyzer, and the specific surface area was measured by the BET specific surface area measuring method using nitrogen adsorption. Consequently, the average particle diameter and the specific surface area were ascertained to be within a predetermined range.

Preparation of Negative Electrode

A mixture was prepared by mixing 97% by mass of artificial graphite (d=0.335 nm), 2% by mass of carboxymethyl cellulose (CMC) as a thickener, and 1% by mass of styrene-butadiene rubber (SBR) as a binder. To the mixture, water was added to make a slurry. The slurry was coated on both sides of a copper foil with a thickness of 8 μm (coating amount: 210 g/m$^2$). Then, the coated foil was dried to remove water, compressed with a compression roller until the packing density reached 1.6 g/cm$^3$, and cut into a predetermined size to prepare a negative electrode plate.

Preparation of Battery Before Pouring

A current collecting tab was welded to each of the positive electrode plate and the negative electrode plate each having a predetermined size. The electrode plates were wound with a polyethylene microporous membrane separator with a thickness of 16 μm interposed therebetween to prepare a wound electrode assembly. The obtained wound electrode assembly was stored into a laminated outer body that was formed into a cup shape. The outer body was sealed with heat except for a pouring hole to prepare a battery before pouring.

Preparation of Battery

A nonaqueous solvent was prepared by mixing 30% by volume of EC, 20% by volume of PC, 50% by volume of methyl pivalate. LiPF$_6$ as an electrolyte salt was dissolved in the nonaqueous solvent to prepare a nonaqueous electrolyte having a LiPF$_6$ concentration of 1 M. Moreover, a predetermined amount of a DOX derivative was added with respect to the total mass of the nonaqueous electrolyte as needed. 6 ml of the nonaqueous electrolyte was poured through the pouring hole, and thereafter vacuum impregnation treatment was performed. The pouring hole was then sealed with heat, and charging and discharging were performed to complete a nonaqueous secondary battery having a design capacity of 1500 mAh (1 It=1500 mA).

Measurement of Battery Characteristics

On each battery of Examples and Comparative Examples prepared as above, initial capacity, high-temperature cycle characteristics, and self-discharge amount were determined by the following measurement methods.

Measurement of Initial Capacity

Each battery of Examples and Comparative Examples was charged in a constant temperature bath at 23° C. at a constant current of 0.5 It=750 mA until the battery voltage reached 4.2 V. After the battery voltage reached 4.2 V, each battery was charged at a constant voltage of 4.2 V until the current value reached 0.12 It=180 mA. Then, the battery was discharged at a constant current of 0.5 It=750 mA until the battery voltage reached 2.75 V. The discharging capacity at this time was determined as an initial capacity.

Measurement of High-Temperature Cycle Characteristic

Each battery of Examples and Comparative Examples was charged in a constant temperature bath at 60° C. at a constant current of 1 It=1500 mA until the battery voltage reached 4.2 V. After the battery voltage reached 4.2 V, each battery was charged at a constant voltage of 4.2 V until the current value reached 0.1 It=150 mA. After a 20-minute break, the battery was discharged at a constant current of 1 It=1500 mA until the battery voltage reached 2.75 V. The discharging capacity at this time was determined as a discharging capacity at the first cycle. This charging and discharging cycle was repeated 400 times in the constant temperature bath at 60° C. The discharging capacity at the 400th cycle was determined as a discharging capacity at the 400th cycle, and the high-temperature cycle characteristic (%) was calculated with the following formula.

High-temperature cycle characteristic(%)=(discharging capacity at the 400th cycle/discharging capacity at the first cycle)×100

Measurement of Self-Discharge Amount

Each battery on which the high-temperature cycle characteristics had been measured was charged in a constant temperature bath at 23° C. at a constant current of 0.5 It=750 mA until the battery voltage reached 4.2 V. After the battery voltage reached 4.2 V, each battery was charged at a constant voltage of 4.2 V until the current value reached (1/50) It=30 mA to achieve a fully charged state. The battery in a fully charged state was left at 23° C. for three months. Then, the battery was recharged at a constant current of 0.01 It=15 mA until the open-circuit voltage of the battery reached the same value as the open-circuit voltage before storage. The amount of charge during this recharge was determined as a self-discharge amount.

EXAMPLES 1 TO 15, COMPARATIVE EXAMPLES 1 TO 10

In each nonaqueous secondary battery of Examples 1 to 15 and Comparative Examples 1 to 10, LiCoO$_2$, having an average particle diameter of 13.1 μm and a specific surface area of 0.25 m$^2$/g, was used as a positive electrode active material. The added amount of each of the various DOX derivatives is shown below as the ratio to the total mass of a nonaqueous electrolyte, and the added amount of each of the various coupling agents is also shown as the ratio to the mass of the positive electrode active material.

In Comparative Example 1, the nonaqueous electrolyte contained no DOX derivative, and no coupling agent was added to the positive electrode mixture layer. In Comparative Examples 2 to 7, 1,3-dioxane as a DOX derivative with a varied concentration of 0.05 to 2.00% by mass was added to the nonaqueous electrolyte, while no coupling agent was added to the positive electrode mixture layer.

In Comparative Examples 8 and 9, no DOX derivative was added to the nonaqueous electrolyte, and aluminum bisethylacetoacetate monoacetylacetonate (Comparative Example 8) or methyltriethoxysilane (Comparative Example 9) was added as a coupling agent to the positive electrode mixture layer. In Comparative Example 10, 0.30% by mass of 1,3-dioxane was added as a DOX derivative to the nonaqueous electrolyte, and 0.20% by mass of aluminum bisethylacetoacetate monoacetylacetonate was added as a coupling agent to the positive electrode mixture layer.

In Examples 1 to 9, 0.20% by mass of aluminum bisethylacetoacetate monoacetylacetonate was added as a coupling agent to the positive electrode mixture layer, and 1.00% by mass of 1,3-dioxane (Example 1), 1.00% by mass each of 2-methyl-1,3-dioxane (Example 2), 4-methyl-1,3-dioxane (Example 3), 2,4-dimethyl-1,3-dioxane (Example 4), 4-phenyl-1,3-dioxane (Example 5), 2,2-dimethyl-5-hydroxy-1,3-dioxane (Example 6), 4,4,6-trimethyl-2-vinyl-1,3-dioxane (Example 7), 5-aryl-1,3-dioxane (Example 8), or 5-ethoxy-1,3-dioxane (Example 9) was added to the nonaqueous electrolyte as a DOX derivative.

In Examples 10 to 15, 0.20% by mass of aluminum bisethylacetoacetate monoacetylacetonate was added as a coupling agent to the positive electrode mixture layer, and 1,3-dioxane as a DOX derivative with a varied concentration of 0.05 to 3.0% by mass was added to the nonaqueous electrolyte. The measurement results of Examples 1 to 15, and Comparative Examples 1 to 10 are listed in Table 1. Table 1 shows the result of Example 1 in two lines for easy understanding.

TABLE 1

Positive electrode: $LiCoO_2$
Average particle diameter: 13.1 μm
Specific surface area: 0.25 $m^2/g$

| | DOX derivative | | Coupling agent | | Initial capacity (mAh) | High-temperature cycle characteristics (%) | Self-discharge amount (mAh) |
|---|---|---|---|---|---|---|---|
| | Name | Amount added (% by mass) | Name | Amount added (% by mass) | | | |
| Comparative Example 1 | None | — | None | — | 1505 | 54 | 9 |
| Comparative Example 2 | 1,3-Dioxane | 0.05 | None | — | 1511 | 62 | 29 |
| Comparative Example 3 | 1,3-Dioxane | 0.20 | None | — | 1500 | 65 | 33 |
| Comparative Example 4 | 1,3-Dioxane | 0.50 | None | — | 1502 | 70 | 44 |
| Comparative Example 5 | 1,3-Dioxane | 1.00 | None | — | 1510 | 72 | 46 |
| Comparative Example 6 | 1,3-Dioxane | 1.50 | None | — | 1504 | 73 | 55 |
| Comparative Example 7 | 1,3-Dioxane | 2.00 | None | — | 1505 | 72 | 61 |
| Comparative Example 8 | None | — | Aluminum bisethylacetoacetate monoacetylacetonate | 0.20 | 1509 | 57 | 17 |
| Comparative Example 9 | None | — | Methyltriethoxysilane | 1.00 | 1500 | 55 | 14 |
| Example 1 | 1,3-Dioxane | 1.00 | Aluminum bisethylacetoacetate monoacetylacetonate | 0.20 | 1507 | 88 | 3 |
| Example 2 | 2-Methyl-1,3-dioxane | 1.00 | Aluminum bisethylacetoacetate monoacetylacetonate | 0.20 | 1502 | 87 | 3 |
| Example 3 | 4-Methyl-1,3-dioxane | 1.00 | Aluminum bisethylacetoacetate monoacetylacetonate | 0.20 | 1502 | 87 | 4 |
| Example 4 | 2,4-Dimethyl-1,3-dioxane | 1.00 | Aluminum bisethylacetoacetate monoacetylacetonate | 0.20 | 1508 | 86 | 3 |
| Example 5 | 4-Phenyl-1,3-dioxane | 1.00 | Aluminum bisethylacetoacetate monoacetylacetonate | 0.20 | 1509 | 82 | 2 |
| Example 6 | 2,2-Dimethyl-5-hydroxy-1,3-dioxane | 1.00 | Aluminum bisethylacetoacetate monoacetylacetonate | 0.20 | 1507 | 84 | 3 |
| Example 7 | 4,4,6-Trimethyl-2-vinyl-1,3-dioxane | 1.00 | Aluminum bisethylacetoacetate monoacetylacetonate | 0.20 | 1504 | 84 | 3 |
| Example 8 | 5-Aryl-1,3-dioxane | 1.00 | Aluminum bisethylacetoacetate monoacetylacetonate | 0.20 | 1504 | 86 | 2 |
| Example 9 | 5-Ethoxy-1,3-dioxane | 1.00 | Aluminum bisethylacetoacetate monoacetylacetonate | 0.20 | 1505 | 88 | 3 |

TABLE 1-continued

Positive electrode: LiCoO$_2$
Average particle diameter: 13.1 μm
Specific surface area: 0.25 m$^2$/g

| | DOX derivative | | Coupling agent | | | | |
|---|---|---|---|---|---|---|---|
| | Name | Amount added (% by mass) | Name | Amount added (% by mass) | Initial capacity (mAh) | High-temperature cycle characteristics (%) | Self-discharge amount (mAh) |
| Comparative Example 10 | 1,3-Dioxane | 0.03 | Aluminum bisethylacetoacetate monoacetylacetonate | 0.20 | 1506 | 58 | 21 |
| Example 10 | 1,3-Dioxane | 0.05 | Aluminum bisethylacetoacetate monoacetylacetonate | 0.20 | 1502 | 74 | 7 |
| Example 11 | 1,3-Dioxane | 0.20 | Aluminum bisethylacetoacetate monoacetylacetonate | 0.20 | 1508 | 81 | 5 |
| Example 12 | 1,3-Dioxane | 0.50 | Aluminum bisethylacetoacetate monoacetylacetonate | 0.20 | 1500 | 85 | 3 |
| Example 1 | 1,3-Dioxane | 1.00 | Aluminum bisethylacetoacetate monoacetylacetonate | 0.20 | 1507 | 88 | 3 |
| Example 13 | 1,3-Dioxane | 1.5 | Aluminum bisethylacetoacetate monoacetylacetonate | 0.20 | 1505 | 86 | 3 |
| Example 14 | 1,3-Dioxane | 2.0 | Aluminum bisethylacetoacetate monoacetylacetonate | 0.20 | 1506 | 77 | 2 |
| Example 15 | 1,3-Dioxane | 3.0 | Aluminum bisethylacetoacetate monoacetylacetonate | 0.20 | 1502 | 73 | 3 |

The following facts were found based on the results listed in Table 1. The results of Comparative Examples 1 to 7, in which no coupling agent was added to the positive electrode mixture layer, show that the self-discharge amount largely increased when 1,3-dioxane was added to the nonaqueous electrolyte (Comparative Examples 2 to 7) compared with the case with no 1,3-dioxane added (Comparative Example 1). However, the high-temperature cycle characteristics and the initial capacity did not largely change depending on the presence of 1,3-dioxane.

The measurement results of Comparative Examples 8, and 9, in which a coupling agent was added to the positive electrode mixture layer but no DOX derivative was added to the nonaqueous electrolyte, show that the initial capacity and the high-temperature cycle characteristics were almost the same as those of the battery of Comparative Example 1, in which a coupling agent and 1,3-dioxane in the nonaqueous electrolyte were not added, but the self-discharge amount was larger than that of the battery of Comparative Example 1.

In contrast, in the case where 0.20% by mass of aluminum bisethylacetoacetate monoacetylacetonate was added as a coupling agent to the positive electrode mixture layer, when 1.00% by mass of various DOX derivatives was added to the nonaqueous electrolyte (Examples 1 to 9), the high-temperature cycle characteristics were better and the self-discharge amount significantly decreased compared with those of Comparative Examples 1 to 9, while the initial capacity results were almost the same, and thus the superior results were obtained.

In the cases where 0.20% by mass of aluminum bisethylacetoacetate monoacetylacetonate was added as a coupling agent to the positive electrode mixture layer, when the added amount of 1,3-dioxane in the nonaqueous electrolyte was less than 0.05% by mass with respect to the total mass of the nonaqueous electrolyte (Comparative Example 10), the high-temperature cycle characteristics largely decreased and the self-discharge amount increased, while the initial capacity results were almost the same as those of Examples 1, and 10 to 15. These results were inferior to those of Examples 1, and 10 to 15. Therefore, the added amount of a DOX derivative in the nonaqueous electrolyte is preferably 0.05% by mass or more.

Based on the results of Examples 1, and 10 to 15, when the added amount of 1,3-dioxane was 1.0% by mass or more in the nonaqueous electrolyte, the high-temperature cycle characteristics tend to decrease as the added amount of 1,3-dioxane increases. Therefore, it is preferred that the added amount of a DOX derivative such as 1,3-dioxane in the nonaqueous electrolyte do not exceed 3.0% by mass.

EXAMPLES 16 TO 33, COMPARATIVE EXAMPLES 11, AND 12

In each nonaqueous secondary battery of Examples 16 to 33, and Comparative Examples 11, and 12, LiCoO$_2$, having an average particle diameter of 13.1 μm and a specific surface area of 0.25 m$^2$/g, was used as a positive electrode active material, and 1,3-dioxane was added as a DOX derivative to the nonaqueous electrolyte to have a concentration of 1.0% by mass.

In Comparative Example 11, ferric trisacetylacetonate was used as a coupling agent. In Examples 16 to 21, various compounds represented by General Formula (I) were used as a coupling agent, and in Examples 22 to 26, various silane coupling agents were used. Each of the coupling agents used in Examples 16 to 21 was a compound having an alkoxy group except for aluminum trisacetylacetonate used in Example 18 and zirconium tetrakisacetylacetonate used in Example 21. The names of the various coupling agents used in Examples 16 to 21 are listed in Table 2.

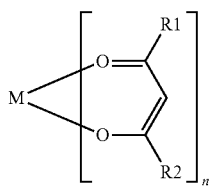

(I)

(where M is one atom selected from Al, Ti, and Zr, each of R1 and R2 is an alkyl group or an alkoxy group having 1 to 18 carbon atoms, and n represents an integer of 1 to 4.)

In Examples 27 to 33 and Comparative Example 12, aluminum bisethylacetoacetate monoacetylacetonate was added as a coupling agent with a varied concentration of 0.003 to 5.00% by mass (Examples 27 to 33) or with a concentration of 7.00% by mass (Comparative Example 12) to the positive electrode mixture. The results of Examples 16 to 33 and Comparative Examples 11, and 12 are listed in Table 2 together with the results of Example 1, and Comparative Example 5.

Among Examples 1, and 16 to 18, in which a compound represented by Chemical Formula (I) was used as a coupling agent, the results of Examples 1, and 16 to 18, in which M was Al, were better in terms of the high-temperature cycle characteristics than the results of Examples 19, and 20, in which M was Ti, and Example 21, in which M was Zr, while the initial capacity and the self-discharge amount results were almost the same. This reveals that M is preferably Al when a compound represented by Chemical Formula (I) is used as a coupling agent.

In Examples 1, and 16 to 18, in which M was Al, it is revealed that the results of Examples 1, 16, and 17, in which R1 or R2 was an alkoxy group, show slightly better high-temperature cycle characteristics than those of Example 18, in which neither R1 nor R2 was an alkoxy group.

Based on the results of Examples 1, and 27 to 33, and Comparative Examples 12, in which the amount of aluminum bisethylacetoacetate monoacetylacetonate as a coupling agent was varied from 0.003 to 7.00% by mass, when the added amount of the coupling agent was 0.003% by mass or

TABLE 2

Positive electrode: LiCoO$_2$
Average particle diameter: 13.1 μm
Specific surface area: 0.25 m$^2$/g
DOX derivative: 1.0% by mass of 1,3-dioxane

| | Coupling agent | | | | Self- |
|---|---|---|---|---|---|
| | Name | Amount added (% by mass) | Initial capacity (mAh) | High-temperature cycle characteristics (%) | discharge amount (mAh) |
| Comparative Example 5 | None | | 1510 | 72 | 46 |
| Example 16 | Aluminum ethylacetoacetate diisopropylate | 0.20 | 1511 | 85 | 4 |
| Example 17 | Aluminum trisethylacetoacetate | 0.20 | 1501 | 86 | 3 |
| Example 1 | Aluminum bisethylacetoacetate monoacetylacetonate | 0.20 | 1507 | 88 | 3 |
| Example 18 | Aluminum trisacetylacetoacetate | 0.20 | 1500 | 83 | 3 |
| Example 19 | Titanium bis(ethylacetoacetate) diisopropoxide | 0.20 | 1502 | 80 | 4 |
| Example 20 | Titanium bisethylacetoacetate bisacetylacetonate | 0.20 | 1501 | 81 | 5 |
| Example 21 | Zirconium tetrakisacetylacetonate | 0.20 | 1504 | 78 | 2 |
| Comparative Example 11 | Ferric trisacetylacetonate | 0.20 | 1507 | 66 | 44 |
| Example 22 | Methyltrimethoxysilane | 1.00 | 1512 | 77 | 5 |
| Example 23 | Dimethyldimethoxysilane | 1.00 | 1500 | 77 | 4 |
| Example 24 | Methyltriethoxysilane | 1.00 | 1502 | 76 | 6 |
| Example 25 | Hexyltrimethoxysilane | 1.00 | 1506 | 79 | 4 |
| Example 26 | 3-Acryloxypropyltrimethoxysilane | 1.00 | 1504 | 76 | 3 |
| Example 27 | Aluminum bisethylacetoacetate monoacetylacetonate | 0.003 | 1503 | 78 | 5 |
| Example 28 | Aluminum bisethylacetoacetate monoacetylacetonate | 0.01 | 1510 | 81 | 6 |
| Example 29 | Aluminum bisethylacetoacetate monoacetylacetonate | 0.10 | 1502 | 84 | 3 |
| Example 30 | Aluminum bisethylacetoacetate monoacetylacetonate | 0.50 | 1508 | 88 | 3 |
| Example 31 | Aluminum bisethylacetoacetate monoacetylacetonate | 1.00 | 1505 | 84 | 4 |
| Example 32 | Aluminum bisethylacetoacetate monoacetylacetonate | 2.00 | 1507 | 80 | 4 |
| Example 33 | Aluminum bisethylacetoacetate monoacetylacetonate | 5.00 | 1512 | 79 | 3 |
| Comparative Example 12 | Aluminum bisethylacetoacetate monoacetylacetonate | 7.00 | 1492 | 75 | 3 |

The following facts were found based on the results listed in Table 2. When 1,3-dioxane was added to the nonaqueous electrolyte, the results of Examples 1, and 16 to 21, in which a compound represented by Chemical Formula (I) was used as a coupling agent, and the results of Examples 22 to 26, in which a silane coupling agent was used, were significantly better in terms of the high-temperature cycle characteristics and the self-discharge amount than the results of Comparative Example 11, in which ferric trisacetylacetonate was used as a coupling agent, while the initial capacity results were almost the same. This reveals that a compound represented by Chemical Formula (I) or a silane coupling agent is preferred as a coupling agent.

more, sufficiently good result was obtained in terms of both the high-temperature cycle characteristics and the self-discharge amount in comparison with the case with no coupling agent added (Comparative Example 5). However, when the added amount of the coupling agent was increased to 7.00% by mass (Comparative Example 12), the initial capacity and the high-temperature cycle characteristics decreased. This reveals that the added amount of a compound represented by Chemical Formula (I) or a silane coupling agent as a coupling agent is preferably 0.003% by mass or more and 5% by mass or less with respect to the mass of a positive electrode active material when 1,3-dioxane or other DOX derivative was added to the nonaqueous electrolyte.

EXAMPLES 34 TO 46, AND COMPARATIVE EXAMPLES 13 TO 31

In each nonaqueous secondary battery of Examples 34 to 46, and Comparative Examples 13 to 31, 1,3-dioxane was added as a DOX derivative to the nonaqueous electrolyte, and aluminum bisethylacetoacetate monoacetylacetonate was added to the positive electrode mixture layer as a coupling agent.

In Examples 34 to 42, and Comparative Examples 13 to 26, $LiCoO_2$ having a varied average particle diameter of 3.3 to 16.4 μm and a varied specific surface area of 0.11 to 0.90 m²/g was used as the positive electrode active material, and 1,3-dioxane and a coupling agent were or were not added. In Examples 43 to 46, and Comparative Examples 27 to 30, various positive electrode active materials other than $LiCoO_2$ were used, and 1,3-dioxane and a coupling agent were or were not added.

In Examples 34 to 46, and Comparative Examples 13 to 30, when 1,3-dioxane was added to the nonaqueous electrolyte, 1,3-dioxane was added so as to have a concentration of 1.00% by mass, and when a coupling agent was added, the coupling agent was added so as to have a concentration of 0.20% by mass. The measurement results of Examples 34 to 46, and Comparative Examples 13 to 30 are listed in Table 3 together with those of Example 1, and Comparative Examples 1, and 5.

The following facts were found based on the results listed in Table 3. In Comparative Example 13, in which $LiCoO_2$, with an average particle diameter of 3.3 μm and a specific surface area of 0.85 m²/g, was used as a positive electrode active material, 1,3-dioxane and a coupling agent were added, but the self-discharge amount largely increased and high-temperature cycle characteristics were poor. However, the initial capacity was relatively good in Comparative Example 13.

In Comparative Examples 14 to 16, in which $LiCoO_2$, having an average particle diameter of 3.5 μm and a specific surface area of 0.63 m²/g, was used as the positive electrode active material, the initial capacity results were almost the same as and the high-temperature cycle characteristics were better, but the self-discharge amount largely increased as compared with the case in which neither 1,3-dioxane nor a coupling agent was added (Comparative Example 14) when only 1,3-dioxane was added (Comparative Example 15) and when both 1,3-dioxane and a coupling agent were added (Comparative Example 16). In Comparative Examples 17 to 19, in which $LiCoO_2$, having an average particle diameter of 5.2 μm and a specific surface area of 0.90 m²/g, was used as the positive electrode active material, the initial capacity results were almost the same and the high-temperature cycle characteristics were better, but the self-discharge amount largely increased as compared with the case in which neither

TABLE 3

Coupling agent: aluminum bisethylacetoacetate monoacetylacetonate

| | | Physical properties of positive electrode | | | | | | |
|---|---|---|---|---|---|---|---|---|
| | Positive electrode active material | Average particle diameter (μm) | Specific surface area (m²/g) | 1,3-Dioxane (% by mass) | Added amount of coupling agent (% by mass) | Initial capacity (mAh) | High-temperature cycle characteristics (%) | Self-discharge amount (mAh) |
| Comparative Example 13 | $LiCoO_2$ | 3.3 | 0.85 | 1.00 | 0.20 | 1511 | 77 | 89 |
| Comparative Example 14 | $LiCoO_2$ | 3.5 | 0.63 | — | — | 1512 | 48 | 19 |
| Comparative Example 15 | $LiCoO_2$ | 3.5 | 0.63 | 1.00 | — | 1503 | 68 | 122 |
| Comparative Example 16 | $LiCoO_2$ | 3.5 | 0.63 | 1.00 | 0.20 | 1512 | 82 | 89 |
| Example 34 | $LiCoO_2$ | 4.5 | 0.55 | 1.00 | 0.20 | 1500 | 85 | 3 |
| Example 35 | $LiCoO_2$ | 4.6 | 0.72 | 1.00 | 0.20 | 1508 | 84 | 2 |
| Comparative Example 17 | $LiCoO_2$ | 5.2 | 0.90 | — | — | 1511 | 51 | 13 |
| Comparative Example 18 | $LiCoO_2$ | 5.2 | 0.90 | 1.00 | — | 1513 | 70 | 87 |
| Comparative Example 19 | $LiCoO_2$ | 5.2 | 0.90 | 1.00 | 0.20 | 1505 | 83 | 76 |
| Example 36 | $LiCoO_2$ | 5.5 | 0.80 | 1.00 | 0.20 | 1504 | 85 | 4 |
| Example 37 | $LiCoO_2$ | 5.7 | 0.67 | 1.00 | 0.20 | 1509 | 89 | 2 |
| Example 38 | $LiCoO_2$ | 6.1 | 0.49 | 1.00 | 0.20 | 1506 | 88 | 3 |
| Example 39 | $LiCoO_2$ | 9.7 | 0.38 | 1.00 | 0.20 | 1510 | 87 | 2 |
| Comparative Example 20 | $LiCoO_2$ | 14.3 | 0.11 | — | — | 1513 | 54 | 6 |
| Comparative Example 21 | $LiCoO_2$ | 14.3 | 0.11 | 1.00 | — | 1511 | 61 | 34 |
| Comparative Example 22 | $LiCoO_2$ | 14.3 | 0.11 | 1.00 | 0.20 | 1511 | 51 | 3 |
| Comparative Example 1 | $LiCoO_2$ | 13.1 | 0.25 | — | — | 1505 | 54 | 9 |
| Comparative Example 5 | $LiCoO_2$ | 13.1 | 0.25 | 1.00 | — | 1510 | 72 | 46 |
| Example 1 | $LiCoO_2$ | 13.1 | 0.25 | 1.00 | 0.20 | 1507 | 88 | 3 |
| Example 40 | $LiCoO_2$ | 14.6 | 0.22 | 1.00 | 0.20 | 1500 | 87 | 2 |
| Example 41 | $LiCoO_2$ | 15.2 | 0.18 | 1.00 | 0.20 | 1510 | 83 | 3 |
| Example 42 | $LiCoO_2$ | 15.5 | 0.13 | 1.00 | 0.20 | 1512 | 81 | 4 |
| Comparative Example 23 | $LiCoO_2$ | 16.4 | 0.16 | — | — | 1510 | 56 | 6 |
| Comparative Example 24 | $LiCoO_2$ | 16.4 | 0.16 | 1.00 | — | 1510 | 60 | 41 |
| Comparative Example 25 | $LiCoO_2$ | 16.4 | 0.16 | 1.00 | 0.20 | 1512 | 49 | 3 |
| Comparative Example 26 | $LiCoO_2$ | 16.6 | 0.12 | 1.00 | 0.20 | 1502 | 47 | 4 |
| Comparative Example 27 | $LiMn_{1/3}Ni_{1/3}Co_{1/3}O_2$ | 10.3 | 0.49 | — | — | 1511 | 55 | 11 |
| Example 43 | $LiMn_{1/3}Ni_{1/3}Co_{1/3}O_2$ | 10.3 | 0.49 | 1.00 | 0.20 | 1507 | 86 | 4 |
| Comparative Example 28 | $LiNiO_2$ | 10.8 | 0.32 | — | — | 1501 | 56 | 21 |
| Example 44 | $LiNiO_2$ | 10.8 | 0.32 | 1.00 | 0.20 | 1501 | 84 | 3 |
| Comparative Example 29 | $LiNi_{0.85}Co_{0.15}O_2$ | 10.2 | 0.31 | — | — | 1503 | 60 | 16 |
| Example 45 | $LiNi_{0.85}Co_{0.15}O_2$ | 10.2 | 0.31 | 1.00 | 0.20 | 1506 | 86 | 3 |
| Comparative Example 30 | $LiCo_{0.99}Al_{0.01}O_2$ | 9.3 | 0.44 | — | — | 1509 | 67 | 6 |
| Example 46 | $LiCo_{0.99}Al_{0.01}O_2$ | 9.3 | 0.44 | 1.00 | 0.20 | 1512 | 89 | 4 |

1,3-dioxane nor a coupling agent was added (Comparative Example 17) when only 1,3-dioxane was added (Comparative Example 18) and both 1,3-dioxane and a coupling agent were added (Comparative Example 19).

In Comparative Examples 20 to 22, in which $LiCoO_2$, having an average particle diameter of 14.3 μm and a specific surface area of 0.11 $m^2/g$, was used as the positive electrode active material, the initial capacity results were almost the same as and the high-temperature cycle characteristics were better, but the self-discharge amount largely increased as compared with the case in which neither 1,3-dioxane nor a coupling agent was added (Comparative Example 20 when only 1,3-dioxane was added (Comparative Example 21). The initial capacity results were almost the same as and the high-temperature cycle characteristics slightly decreased, but the self-discharge amount decreased as compared with the case in which neither 1,3-dioxane nor a coupling agent was added (Comparative Example 20) when both 1,3-dioxane and a coupling agent were added (Comparative Example 22), and thus the results were very good.

In Comparative Examples 23 to 25, in which $LiCoO_2$, having an average particle diameter of 16.4 μm and a specific surface area of 0.16 $m^2/g$, was used as the positive electrode active material, the initial capacity results were almost the same as and the high temperature charge storage characteristics were slightly better, but the self-discharge amount largely increased compared with the case in which neither 1,3-dioxane nor a coupling agent was added (Comparative Example 23) when only 1,3-dioxane was added (Comparative Example 24). When both 1,3-dioxane and a coupling agent were added (Comparative Example 25), the initial capacity results were almost the same as and the self-discharge amount was much better, but the high-temperature cycle characteristics decreased as compared with the case in which neither 1,3-dioxane nor a coupling agent was added (Comparative Example 23). When $LiCoO_2$, having an average particle diameter of 16.6 μm and a specific surface area of 0.12 $m^2/g$, was used as the positive electrode active material and both 1,3-dioxane and a coupling agent were added (Comparative Example 26), the initial capacity results were almost the same as and the self-discharge amount was much better but the high-temperature cycle characteristics decreased as compared with the case of Comparative Example 23.

In contrast, in Examples 1, and 34 to 42, in which $LiCoO_2$, having an average particle diameter of 4.5 μm to 15.5 μm and a specific surface area of 0.13 to 0.80 $m^2/g$, was used as the positive electrode active material and both 1,3-dioxane and a coupling agent were added, superior effects were obtained as follows: the initial capacities were 1500 mAh or more, the cycle characteristics were 81% or more, and the self-discharge amounts were 4 mAh or less.

The following facts were found by comparing the results of Comparative Examples 13, 16, 19, 22, 25, and 26, in which both 1,3-dioxane and a coupling agent were added, with the results of Examples 34 to 42 in the cases where the positive electrode active material was $LiCoO_2$. When the positive electrode active material had an average particle diameter of less than 4.5 μm, even if the specific surface area was within a range of 0.13 to 0.80 $m^2/g$, the self-discharge amount largely increased, while the initial capacity and the high-temperature cycle characteristics results were almost the same. Furthermore, when the positive electrode active material had an average particle diameter of more than 15.5 μm, even if the specific surface area was within a range of 0.13 to 0.80 $m^2/g$, the high-temperature cycle characteristics decreased compared with the case in which the positive electrode active material had an average particle diameter of 15.5 μm or less, while the initial capacity and the self-discharge amount results were almost the same.

When the positive electrode active material had a specific surface area of less than 0.13 $m^2/g$, the high-temperature cycle characteristics decreased, while the initial capacity and the self-discharge amount results were almost the same even if the positive electrode active material had an average particle diameter of 4.5 to 15.5 μm. Furthermore, when the positive electrode active material had a specific surface area of more than 0.80 $m^2/g$, the self-discharge amount largely increased, while the initial capacity and the high-temperature cycle characteristics results were almost the same even if the positive electrode active material had an average particle diameter of 4.5 to 15.5 μm.

Accordingly, in the nonaqueous secondary batteries of the invention, it is clear that both a DOX derivative such as 1,3-dioxane and a coupling agent are preferably contained and the positive electrode active material preferably has an average particle diameter of 4.5 to 15.5 μm and a specific surface area of 0.13 to 0.80 $m^2/g$.

The measurement results of Examples 43 to 46, and Comparative Examples 27 to 30 will now be discussed. In Examples 43 to 46, and Comparative Examples 27 to 30, $LiMn_{1/3}Ni_{1/3}Co_{1/3}O_2$, $LiMn_2O_4$, $LiNiO_2$, $LiNi_{0.85}Co_{0.15}O_2$, or $LiCo_{0.99}Al_{0.01}O_2$ was used as a positive electrode active material, and neither 1,3-dioxane nor a coupling agent was contained (Comparative Examples 27 to 30), or both 1,3-dioxane and a coupling agent were contained (Examples 43 to 46). In Examples 43 to 46, and Comparative Examples 27 to 30, the average particle diameter of the positive electrode active material was within a range of 4.5 to 15.5 μm and the specific surface area was within a range of 0.13 to 0.80 $m^2/g$.

Based on the results listed in Table 3, with any of $LiMn_{1/3}Ni_{1/3}Co_{1/3}O_2$, $LiMn_2O_4$, $LiNiO_2$, $LiNi_{0.85}Co_{0.15}O_2$, and $LiCo_{0.99}Al_{0.01}O_2$ was used as a positive electrode active material, when both 1,3-dioxane and a coupling agent were contained (Examples 38 to 42), the high-temperature cycle characteristics and the self-discharge amount were better than those in the case in which neither 1,3-dioxane nor a coupling agent was contained (Comparative Examples 27 to 30), while the initial capacity results were almost the same. Therefore, it is clear that the results of the study on using $LiCoO_2$ was used as a positive electrode active material can be equally applied to positive electrode active materials made of a lithium composite oxide and are commonly used in nonaqueous secondary batteries.

What is claimed is:

1. A nonaqueous secondary battery comprising:
a positive electrode plate formed with a positive electrode mixture layer having a lithium transition-metal composite oxide comprising at least one metal selected from the group consisting of Co, Ni and Mn as a positive electrode active material;
a negative electrode plate;
a separator; and
a nonaqueous electrolyte,
the positive electrode active material having an average particle diameter of 4.5 to 15.5 μm and a specific surface area of 0.13 to 0.80 $m^2/g$,
the positive electrode mixture layer containing a coupling agent represented by General Formula (I) at a content of 0.003% by mass or more and 5% by mass or less with respect to the mass of the positive electrode active material, and
the nonaqueous electrolyte containing a DOX derivative represented by General Formula (II) at a content of 0.05% by mass or more and 3.0% by mass or less with respect to the total mass of the nonaqueous electrolyte:

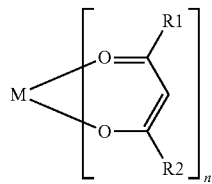
(I)

(where M is one atom selected from Al, Ti, and Zr, each of R1 and R2 is an alkyl group or an alkoxy group having 1 to 18 carbon atoms, and n represents an integer of 1 to 4),

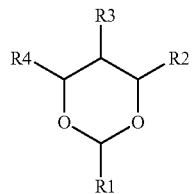
(II)

(where each of R1 to R4 is a hydrogen atom, a fluorine atom, a hydroxyl group, an alkyl or alkoxy group having 1 to 4 carbon atoms, an aryl group, a vinyl group, or an allyl group);
wherein the coupling agent represented by General Formula (I) is at least one compound selected from a group consisting of aluminum ethyl acetoacetate diisopropylate, aluminum tris(ethyl acetoacetate), aluminum bis(ethyl acetoacetate) mono(acetyl acetonate), and aluminum tris(acetyl acetoacetate); and
wherein the DOX derivative represented by General Formula (II) is at least one compound selected from a group consisting of: 1,3-dioxane; 2-methyl-1,3-dioxane; 4-methyl-1,3-dioxane; 2,4-dimethyl-1,3-dioxane; 4-phenyl-1,3-dioxane; 2,2-dimethyl-5-hydroxy-1,3-dioxane; 4,4,6-trimethyl-2-vinyl-1,3-dioxane; 5-aryl-1,3-dioxane; and 5-ethoxy-1,3-dioxane.

2. The nonaqueous secondary battery according to claim 1, wherein the positive electrode mixture layer contains a coupling agent represented by General Formula (I), where M is Al:

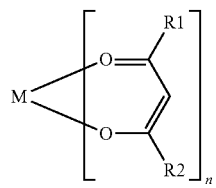
(I)

(where each of R1 and R2 is an alkyl group or an alkoxy group having 1 to 18 carbon atoms, and n represents an integer of 1 to 4).

3. The nonaqueous secondary battery according to claim 1, wherein the positive electrode mixture layer contains a coupling agent represented by General Formula (I), where at least one of R1 and R2 is an alkoxy group:

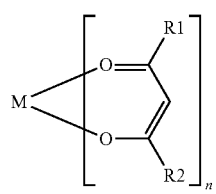
(I)

(where M is one atom selected from Al, Ti, and Zr, each of R1 and R2 is an alkyl group or an alkoxy group having 1 to 18 carbon atoms, and n represents an integer of 1 to 4).

4. The nonaqueous secondary battery according to claim 1, wherein the nonaqueous electrolyte further contains tertiary carboxylic acid ester.

5. The nonaqueous secondary battery according to claim 4, wherein the tertiary carboxylic acid ester is at least one of methyl pivalate and ethyl pivalate.

6. The nonaqueous secondary battery according to claim 4, wherein the tertiary carboxylic acid ester is methyl pivalate.

* * * * *